United States Patent [19]

Thum

[11] Patent Number: 5,349,033
[45] Date of Patent: Sep. 20, 1994

[54] PROCESS FOR THE PREPARATION OF POLYOLEFIN

[75] Inventor: Gerhard Thum, Hofheim am Taunus, Fed. Rep. of Germany

[73] Assignee: Hoechst Aktiengesellschaft, Frankfurt am Main, Fed. Rep. of Germany

[21] Appl. No.: 117,634

[22] Filed: Sep. 7, 1993

Related U.S. Application Data

[63] Continuation of Ser. No. 946,816, Sep. 17, 1992, abandoned, which is a continuation of Ser. No. 780,423, Oct. 22, 1991, abandoned, which is a continuation of Ser. No. 270,407, Nov. 7, 1988, abandoned, which is a continuation of Ser. No. 63,502, Jun. 11, 1987, abandoned.

[30] Foreign Application Priority Data

Jun. 14, 1986 [DE] Fed. Rep. of Germany ....... 3620060

[51] Int. Cl.$^5$ ............... C08F 4/654; C08F 10/00
[52] U.S. Cl. ................... 526/140; 502/116; 502/121; 502/122; 502/123; 502/124; 502/126; 526/125; 526/128; 526/139; 526/141; 526/142; 526/144; 526/352; 526/908; 526/909

[58] Field of Search ............... 526/125, 144, 128, 139, 526/140, 141, 142

[56] References Cited

U.S. PATENT DOCUMENTS

| | | | |
|---|---|---|---|
| 4,252,670 | 2/1981 | Count et al. | 526/142 |
| 4,363,902 | 12/1982 | Kurz | 526/125 |
| 4,439,539 | 3/1984 | Takitani et al. | |
| 4,442,225 | 4/1984 | Takitani et al. | |
| 4,464,478 | 8/1984 | Scata et al. | 526/125 |
| 4,670,525 | 6/1987 | Loontzens et al. | 526/142 |

FOREIGN PATENT DOCUMENTS

| | | | |
|---|---|---|---|
| 0099284 | 1/1984 | European Pat. Off. | C08F 10/00 |
| 0143002 | 5/1985 | European Pat. Off. | |
| 3010202 | 9/1981 | Fed. Rep. of Germany | |
| 3025759 | 2/1982 | Fed. Rep. of Germany | |
| 2047255 | 11/1980 | United Kingdom | C08F 4/60 |

*Primary Examiner*—Edward J. Smith

[57] ABSTRACT

It is possible to obtain globular polymers in the polymerization of alpha-olefins by means of a highly active, spherical Ziegler catalyst. The polymers have a high bulk density and can be processed very easily.

18 Claims, No Drawings

PROCESS FOR THE PREPARATION OF POLYOLEFIN

This application is a continuation of U.S. application Ser. No. 07/946,816, filed Sep. 17, 1992, now abandoned, which is a continuation of the copending U.S. application Ser. No. 07/780,423, filed Oct. 22, 1991, now abandoned, which is a continuation of U.S. application Ser. No. 07/270,407 filed Nov. 7, 1988, now abandoned, which was a continuation of U.S. application Ser. No. 07/062,502, filed Jun. 11, 1987, now abandoned.

The present invention relates to a process for the preparation of a polyolefin by means of a highly active, spherical Ziegler catalyst, by means of which considerable simplifications and advantages in handling and processing the products are achieved.

A large number of catalysts of the Ziegler type for the polymerization of alpha-olefins are already known. Many of these catalysts are based on magnesium chloride, as the supporting material, this being obtained by reacting an organomagnesium compound $R_2Mg$, such as, for example, butylethylmagnesium, with a chlorinated hydrocarbon compound $R'$-Cl, such as, for example, carbon tetrachloride (cf U.S. Pat. Nos. 4,442,225 and 4,439,539 and German Offenlegungsschrift 3,010,202).

It is not possible, however, in this way to obtain a magnesium chloride having a spherical shape.

On the other hand, it is known that globular magnesium chloride is formed when an organomagnesium compound $R_2Mg$ is reacted with a chlorinated organic compound $R'$-Cl in the presence of an organoaluminum compound, such as triethylaluminum, and an electron donor, such as diisoamyl ether (cf European Published Specification 99,284).

Limitations applying to this are that $R'$ must be a hydrocarbon radical having three or more carbon atoms and the carbon atom adjacent to the chlorine must be either a secondary or tertiary carbon atom.

It is also known that catalysts can be prepared by reacting magnesium chloride with alkoxy compounds of the elements of the I to VI main group and/subgroup of the periodic system, followed by treatment with a compound of titanium, zirconium or vanadium (cf German Offenlegungsschrift 3,025,759). In addition to a low contact catalyst activity (<5 kg of polymer/mmol of Ti), however, the catalyst granules in these catalysts do not have a spherical shape. Furthermore, these catalysts only afford products having a broad distribution of molecular weight which are unsuitable for certain applications, such as, for example, precision injection molding or the blow-molding of special hollow articles.

Finally, it is possible to obtain, in a very involved process of preparation, a catalyst based on magnesium chloride and having spherical granules. This requires a two-stage reduction reaction with alkyl aluminum halides and organometallic compounds of magnesium, zinc or aluminum, followed by pre-polymerization, again in one or two stages (cf European Published Specification 143,002). However, this catalyst can only be employed in the gas phase copolymerization of ethylene with higher alpha-olefins. Disadvantages in the resulting copolymers are, additionally, the high residual content of titanium in the polymer, the low density and the broad particle size distribution of the polymer.

It has now been found that it is possible to prepare in a simple manner a highly active and, at the same time, spherical catalyst by means of which it is possible to obtain globular polymers of alpha-olefins which are distinguished by a narrow particle size distribution and, at the same time, a large average particle diameter.

The invention therefore relates to a process for the preparation of a polyolefin by polymerizing alpha-olefins at a temperature from 50° to 150° C. and under a pressure of 1 to 40 bar in the presence of a catalyst composed of a transition metal component (component A) and an organometallic compound (component B) in which the component A has been formed by reacting an organomagnesium compound with an organoaluminum compound, an electron donor, an organic chlorine compound and a transition metal compound, which comprises carrying out the polymerization in the presence of a catalyst in which the component A has been prepared by a) reacting an organomagnesium compound of the formula $R^1MgR^2$ in which $R^1$ and $R^2$ are identical or different alkyl radicals having 2 to 12 carbon atoms with an organoaluminum compound of the formula $AlR^3{}_n(OR^4)_{3-n}$ in which $R^3$ and $R^4$ are identical or different alkyl radical shaving 1 to 8 carbon atoms and n denotes 0, 1, 2 or 3, or with the product from the reaction of aluminum trialkyls or aluminum dialkyl hydrides with diolefins containing 4 to 20 carbon atoms, and a primary, aliphatic chlorinated hydrocarbon in an amount of 0.01 to 15 mol of the organoaluminum compound and 0.5 to 2.5 mol of the chlorinated hydrocarbon, relative to 1 mol of the organomagnesium compound, at a temperature from 30° to 110° C., b) treating the resulting solid with an electron donor in an amount of 0.1 to 1 mol per gram atom of the magnesium present in the solid, at a temperature from 0° to 100° C., and c) reacting the supporting material thus obtained with a compound of titanium or zirconium or the formula $MeX_m(OR^5)_{4-m}$ in which Me is Ti or Zr, $R^5$ is an alkyl radical having 2 to 10 carbon atoms, X is a halogen atom and is an integer from 0 to 4, in an amount of 0.1 to 2 mol per gram atom of the magnesium present in the supporting material, and at a temperature from 30° to 120° C.

A solid of spherical shape is initially formed. For this purpose, an organomagnesium compound is reacted with an organoaluminum compound and a primary, aliphatic chlorinated hydrocarbon.

The organomagnesium compound is a magnesium dialkyl of the formula $R^1MgR^2$ in which $R^1$ and $R^2$ are identical or different alkyl radicals having 2 to 12 carbon atoms.

Di-n-butylmagnesium, di-n-octylmagnesium, n-butyl-n-octyl-magnesium, n-butyl-ethylmagnesium, n-butyl-sec-butylmagnesium or mixtures of these compounds are preferred.

A suitable organoaluminum compound is an alkyl aluminum or alkoxy aluminum compound of the formula $AlR^3{}_n(OR^4)_{3-n}$ in which $R^3$ and $R^4$ are identical or different alkyl radicals having 1 to 8 carbon atoms and n denotes 0, 1, 2 or 3. The product from the reaction of aluminum-trialkyls or aluminum dialkyl hydrides having hydrocarbon radicals with diolefins containing 1 to 6 carbon atoms, preferably isoprene, is also equally suitable. Aluminum isoprenyl may be mentioned as an example.

Examples of suitable primary, aliphatic chlorinated hydrocarbons are carbon tetrachloride, chloroform, methylene chloride, 1-chloropropane or 1,1,1-trichloroethane, and it is also possible to employ mixtures. It is preferable to use chloroform and 1-chloropropane.

The spherical-shaped solid is prepared by dissolving the organomagnesium compound and the organoaluminum compound in an inert, liquid hydrocarbon under an atmosphere of nitrogen or argon. This solution is combined, while simultaneously stirring at a temperature from 30° to 110° C., preferably from 40° to 80° C., with a solution of the chlorinated hydrocarbon. The reaction can be carried out by adding the chlorinated hydrocarbon to the solution of the organomagnesium and organoaluminum compound in the liquid hydrocarbon, or vice versa.

It is possible to vary both the reaction time and the degree of dilution of the reactants within wide limits in this reaction. The reaction time is 30 minutes to several hours, preferably 1 hour to 5 hours. The reactants are employed in the form of 0.5-molar to 15-molar solutions.

The mixture contains up to 0.15 mol, preferably up to 0.10 mol, of the organoaluminum compound and up to 2.5 mol, preferably up to 2.0 mol, of the chlorinated hydrocarbon, relative to one mol of organomagnesium compound.

The solid formed is composed essentially of magnesium chloride together with a little aluminum chloride. Before being reacted further, it is preferably washed several times with a liquid hydrocarbon.

The solid is composed of spherical particles having an average diameter of 20 to 110 μm, preferably 60 to 90 μm. The ratio of the mass average diameter, $D_m$, to the number average diameter, $D_n$, is less than 1.5 and is preferably between 1.01 and 1.15. The ratio of greatest to small diameter D/d is within the range from 1.05 to 1.15.

The spherical-shaped solid is then suspended in a liquid hydrocarbon, the concentration not being decisive for further reaction. It is preferable, however, to use a suspension which is as concentrated as possible and at the same time readily stirrable and which contains 0.1 to 1.5, preferably 0.3 to 0.9, mol of magnesium chloride per liter of liquid hydrocarbon.

An electron donor is then added to the suspension of the spherical-shaped solid. Suitable electron donors are oxygen-containing compounds of aluminum, silicon, phosphorus or sulfur, nitrogen or silicon compounds having alkyl or aryl radicals containing 1 to 8 carbon atoms, such as, for example, triethylamine or hexamethyldisilane, or aliphatic or aromatic ethers containing identical or different organic radicals.

It is preferable to use alkoxyaluminum compounds, dialkyl sulfites, aliphatic ethers and alkyl silicates.

The electron donor is added to the spherical-shaped solid in a molar ratio of 0.1 to 1, preferably 0.1 to 0.6, relative to 1 gram atom of magnesium, at a temperature from 0° to 100° C., preferably from 30° to 80° C.

Depending on the reactivity of the reactants, the reaction time is 0.5 to 5 hours, preferably 1 to 3 hours.

The spherical-shaped supporting material obtained in this manner is either washed several times with an inert liquid hydrocarbon at 0° to 100° C., preferably at 20° to 60° C., or is immediately reacted, under an atmosphere of nitrogen or argon, with a compound of titanium or zirconium of the formula $MeX_m(OR^5)_{4-m}$ in which Me is Ti or Zr, $R^5$ is an alkyl radical having 2 to 10 carbon atoms, X is a halogen atom, preferably chlorine, and m is an integer from 0 to 4, but preferably 2 or 4. It is possible to employ a mixture of several of these compounds.

Examples of preferred compounds are $TiCl_4$, $TiCl_3(OEt)$, $TiCl_3(O-iPr)$, $TiCl_2(OEt)_2$, $TiCl_2(O-iPr)_2$, $TiCl_2(O-CH_2CH_6H_5)_2$, $TiCl(o-iBu)_3$, $Ti(OEt)_4$, $Ti(O-Pr)^2_4$ or $Ti(O-iPr)_4$.

$TiCl_4$, $TiCl_2(OEt)_2$ and $Ti(OEt)_4$ or a mixture of these compounds are very particularly preferred.

In the reaction described above, the titanium or zirconium compound is employed in an amount of 0.1 to 2 mol, preferably 0.2 to 1.8 mol, relative to one gram atom of magnesium in the spherical-shaped supporting material.

The reaction temperature is 30° to 120° C., preferably 60° to 95° C., and the reaction time is 30 minutes to several hours, preferably 1 to 5 hours, depending on the required coating of titanium or zirconium.

The catalyst component A prepared in this manner is finally freed from soluble impurities, such as metal compounds or halogen compounds, by repeated washing with an inert hydrocarbon at a temperature from 0° to 100° C., preferably from 10° to 50° C.

The catalyst component A prepared in accordance with the invention is in the form of spherical particles which have an average diameter of 20 to 110 μm, preferably 60 to 90 μm, and in which the ratio of mass average diameter, μm, and in which the ratio of mass average diameter, $D_m$, to number average diameter $D_n$, is less than 1.5, preferably 1.01 to 1.2. The ratio D/d is within the range from 1.02 to 1.12.

The component A is employed for the polymerization of alpha-olefins in the form of a suspension in an inert hydrocarbon, or, after removing the suspending agent, in the dry state. The polymerization of ethylene or propylene is preferred, or the copolymerization of ethylene and/or propylene with an alpha-olefin having 4 to 10 carbon atoms and one or more double bonds, such as, for example, 1-butene, isobutene, 1-hexene or 1,3-butadiene.

The polymerization can be carried out either continuously or discontinuously in the gas phase or in saturated hydrocarbons having 3 to 15 carbon atoms, such as, for example, propane, butanes, pentanes, hexanes, heptanes, cyclohexanes or mixtures of such compounds.

In general, hydrogen is also additionally employed as a molecular weight regulator, and an aluminum compound of the formula $AlR^6_pY_{3-p}$ in which p is 1, 2 or 3 and $R^6$ is an alkyl or aryl radical having 1 to 20 carbon atoms and Y is hydrogen, a halogen atom or an alkoxy or aryloxy group each of which has 1 to 20 carbon atoms, is employed as the component b (co-catalyst).

Examples are halogen-containing organoaluminum compounds, such as dialkyl aluminum halides, alkylaluminum dihalides or alkylaluminum sesquichlorides, and also aluminum trialkyls or aluminum alkyl hydrides, which can be employed on their own or as a mixture.

It is preferable to use aluminum trialkyls, such as, for example, aluminum triethyl or aluminum triisobutyl.

The polymerization temperature is 50° to 150° C., preferably 50° to 100° C., and the pressure is 1 to 40 bar, preferably 3 to 12 bar.

The polymers and copolymers prepared in the process according to the invention are distinguished by a compact, uniform, spherical shape, together with a very narrow particle size distribution. The ratio of mass average diameter, $D_m$, to number average diameter $D_n$, is less than 1.5, preferably 1.02 to 1.3. The ratio D/d is within the range from 1.05 to 1.2. The diameter of the polymer particle is within the range from 100 to 1800 $\mu$m, preferably 600 to 1500 $\mu$m. The polymers have a high bulk density and can be processed in an excellent manner.

A further advantage of the catalyst according to the invention is its high contact catalyst activity, so that only very small amounts of the catalyst are required for the polymerization. As a result, it is not necessary either to subject the polymers to an additional after-treatment, such as, for example, involved washing or purifying operations. Nor does any undesirable discoloration of the product occur through residues of catalysts, which can frequently result in the stability to light of the polymers being impaired.

The residual content of titanium or zirconium in the polymers prepared in accordance with the invention is less than 4 ppm, frequency less than 2 ppm.

Above all, however, considerable simplifications and advantages in handling, drying and processing are achieved by virtue of the spherical shape and the associated very good free flow of the polymers and copolymers.

The invention is illustrated below in greater detail by means of the examples.

The melt flow index MFI (190/5) was determined as specified in DIN 53 735 at 190° C. and at a loading of 5 kp.

The ratio of $D_m$ to $D_n$ was determined as specified in NF X 11-630 dated June 1981:

$D_m = [\Sigma ni(Di)^3 Di]/[\Sigma ni\ (Di)^3]$
$D_n = [\Sigma ni\ Di]/\Sigma ni$
ni = number i of samples of identical diameter
Di = diameter of the i-th sample.

The particle size distribution $D_m/D_n$ of the component A was determined by image analysis using an IBAS 1. The particle size distribution $D_m/D_n$ of the polymer was determined by sieve analysis as specified in DIN 4188.

EXAMPLE 1

10.5 mmol of alunimum triethyl were added to 200 ml of a solution of di-n-butylmagnesium in heptane (corresponding to 105 milligram atoms of Mg), and the mixture was added dropwise, with vigorous stirring and in the course of 90 minutes, at 45° ± 10° C. to a mixture of 165 mmol of 1-chloropropane and 30 ml of petroleum ether. The mixture was stirred for a further 3 hours at 80° C. and the solid was extracted by washing 5 times with a total of 1200 ml of petroleum ether.

This gave a spherical-shaped solid having an average diameter ($d_{50}$) of 60 $\mu$m.

Mg:Cl:Al = 1:2.14:0.04
$D_m/D_n = 1.13$, D/d = 1.1

EXAMPLE 2

8.5 mmol of aluminum triisopropylate were first added to 200 ml of a solution of butyloctylmagnesium in heptane (corresponding to 185 milligram atoms of Mg), and the mixture was stirred for 40 minutes at 50° C. 370 mmol of chloroform were then added dropwise in the course of 75 minutes at 70° ± 5° C., the mixture was stirred for two hours at 85° C. and the spherical-shaped solid was washed with 800 ml of petroleum ether.

Mg:Cl:Al = 1:2.2:0.06
$d_{50} = 80\ \mu$m

EXAMPLE 3

670 ml of a solution of butyloctylmagnesium in heptane (corresponding to 570 milligram atoms of Mg), containing 28.5 mmol of aluminum triisobutyl, were added dropwise, with uniform stirring and in the course of three hours, at 70° ± 5° C./ to a mixture of 200 ml of 100/200 petroleum ether and 70 ml (860 mmol) of chloroform. The brown suspension was stirred for a further three hours at 75° C., and the solid was washed 5 times with a total of 2500 ml of petroleum ether.

Mg:Cl:Al = 1:2.05:0.03
$D_m/D_n = 1.09$
$d_{50} = 90\ \mu$m

EXAMPLE 4

The procedure was analogous to that of Example 3, but 650 mmol of carbon tetrachloride were used instead of chloroform.

Mg:Cl:Al = 1:2.29:0.05
$D_m/D_n = 1.14$
$d_{50} = 70\ \mu$m

EXAMPLE 5

200 ml of butyloctylmagnesium in heptane (corresponding to 175 milligram atoms of Mg), containing 7 mmol of isoprenylaluminum, were added dropwise, at 75° C. and in the course of 60 minutes, to a mixture of 60 ml of petroleum ether and 30 ml (370 mmol) of chloroform. The mixture was then stirred for 60 minutes at 80° C. and for a further 4 hours at 90° C. The spherical-shaped solid was washed 5 times with a total of 1500 ml of petroleum ether.

Mg:Cl:Al = 1:2.03:0.01
$D_m/D_n = 1.03$
$d_{50} = 75\ \mu$m

EXAMPLE 6

25 mmol of aluminum triisopropylate were added at 40° C. to 300 ml of a suspension of the solid prepared in Example 1 in 100/200 petroleum ether (corresponding to 80 milligram atoms of Mg), and the mixture was then stirred for two hours at 95° C., and the suspension was cooled to 50° C. 120 mmol of titanium tetrachloride, dissolved in 20 ml of petroleum ether, were added dropwise at this temperature in the course of 30 minutes. The mixture was stirred for a further 4 hours at 90° C., and the deep violet precipiate was washed with 5 times 200 ml of petroleum ether. The spherical-shaped catalyst component A had an average particle diameter ($d_{50}$) of 60 $\mu$m.

Mg:Ti:Cl:Al = 1:0.07:2.68:0.02
$D_m/D_n = 1.1$
$d_{50} = 80\ \mu$m

EXAMPLE 7

80 mmol of diethyl sulfite were added at 20° C. to 500 ml of a suspension in petroleum ether of the solid prepared in Example 2 (corresponding to 200 milligram atoms of Mg), and the mixture was stirred for two hours at 80° C. The dark gray suspension was cooled to 50° C. and washed with 1300 ml of petroleum ether. 230 mmol of titanium tetrachloride were then added dropwise at this temperature in the course of 30 minutes. Further reaction at 95° C. afforded a violet, spherical-shaped catalyst component A, which was washed in suspension with 5 times 200 ml of petroleum ether.

Mg:Ti:Cl:Al = 1:0.07:2.28:0.02

$D_m/D_n = 1.1$
$d_{50} = 80$ μm

EXAMPLE 8

The procedure was analogous to that of Example 7, but the solid from Example 5 was employed instead of the solid from Example 2.
Mg:Ti:Cl:Al = 1:0.11:2.05:0.02
$D_m/D_n = 1.04$
$d_{50} = 70$ μm

EXAMPLE 9

120 mmol of dipropyl sulfite were added at 35° C. to 500 ml of a petroleum ether suspension of the sol id prepared in accordance with Example 3 (corresponding to 200 milligram atoms of Mg), and the mixture was stirred for 90 minutes at 80° C. The gray suspension was then washed several times with petroleum ether at 60° C. A mixture of 270 mmol of titanium tetrachloride and 30 mmol of titanium tetraethylate, dissolved in 50 ml of petroleum ether, was added dropwise at this temperature in the course of 30 minutes. The mixture was stirred for 60 minutes at 80° C. and for 120 minutes at 95° C., and the violet precipitate was then washed with 10 times 200 ml of petroleum ether.
Mg:Ti:Cl:Al = 1:0.2:2.5:0.04
$D_m/D_n = 1.2$
$d_{50} = 90$ μm

EXAMPLE 10

The procedure was analogous to that of Example 6, but the solid from Example 4 was employed instead of the solid from Example 1.
Mg:Ti:Cl:Al = 1:0.13:2.35:0.14
$D_m/D_n = 1.15$
$d_{50} = 70$ μm

EXAMPLE 11

The procedure was analogous to that of Example 7, but 60 mmol of diethyl silicate were employed instead of diethyl sulfite.
Mg:Ti:Cl:Al = 1:0.08:2.13:0.02

EXAMPLE 12

The procedure was analogous to that of Example 11, but a mixture of 210 mmol of dichlorodiethoxytitanium and 30 mmol of titanium tetrachloride was employed instead of titanium tetrachloride.
Mg:Ti:Cl:Al = 1:0.05:2.33:0.03

EXAMPLE 13

The procedure was analogous to that of Example 6, but employing the solid from Example 3 and 40 mmol of diisobutyl ether instead of aluminum triisopropylate.
Mg:Ti:Cl:Al = 1:0.09:2.46:0.01

EXAMPLE 14

The procedure was analogous to that of Example 6, but employing the solid from Example 3 and a mixture of 120 mmol of titanium tetraethylate and 30 mmol of titanium tetrachloride instead of titanium tetrachloride.
Mg:Ti:Cl:Al = 1:0.19:2.17:0.08

EXAMPLES 15 TO 34

The polymerization of ethylene was carried out in 1,000 ml of petroleum ether under the conditions mentioned in the table a 1.5 liter steel autoclave in the presence of hydrogen as molecular weight regulator and at a temperature of 85° C. and a pressure of 7 bar. 4 mmol of triethylaluminum (TEA) or 3 mmol of triisobutylaluminum (TIBA) were added as component B. The bulk density of the globular polyethylene was 300 to 450 g/l and its density was 0.910 to 0.985 g/cc. The D/d was within the range from 1.05 to 1.2.

The content of material finer than 300 μm was less than 0.01%. The residual content of titanium in the polymer was less than or equal to 4 ppm.

| Example no. | Catalyst component A according to example | Ti [mmol] | $H_2$ [bar] | Time [hr.] | Yield [g of PE/ mmol of Ti] | MFI (190/5) [g/10 mins.] | $D_m/D_n$ | $d_{50}$ [μm] |
| --- | --- | --- | --- | --- | --- | --- | --- | --- |
| 15 | 6 | 0.005 | 2.5 | 2 | 21900 | 2.95 | 1.09 | 910 |
| 16 | 7 | 0.002 | 1.4 | 2 | 75800 | 0.05 | 1.04 | 1500 |
| 17 | 7 | 0.03 | 5.6 | 5 | 23100 | 220 | 1.18 | 800 |
| 18 | 8 | 0.05 | 3.85 | 1 | 19200 | 70 | 1.17 | 980 |
| 19 | 8 | 0.005 | 2.5 | 3 | 64600 | 2.3 | 1.02 | 1190 |
| 20 | 8 | 0.03 | 5.8 | 2 | 12100 | 230 | 1.03 | 790 |
| 21 | 9 | 0.003 | 2.5 | 5 | 38200 | 0.98 | 1.09 | 1150 |
| 22 | 10 | 0.004 | 2.5 | 5 | 49200 | 1.15 | 1.2 | 750 |
| 23 | 10 | 0.01 | 3.85 | 2 | 22400 | 16 | 1.2 | 810 |
| 24 | 11 | 0.05 | 3.85 | 2 | 18400 | 17 | 1.18 | 880 |
| 25 | 11 | 0.005 | 3.85 | 5 | 39500 | 19 | 1.12 | 920 |
| 26 | 11 | 0.005 | 1.4 | 5 | 68800 | 0.18 | 1.08 | 1400 |
| 27 | 12 | 0.003 | 1.4 | 2 | 30660 | 0.12 | 1.1 | 1220 |
| 28 | 12 | 0.025 | 3.85 | 2 | 20100 | 20 | 1.13 | 1100 |
| 29 | 12 | 0.01 | 3.85 | 5 | 33900 | 22 | 1.09 | 980 |
| 30 | 12 | 0.001 | 5.25 | 5 | 16300 | 170 | 1.18 | 770 |
| 31 | 13 | 0.005 | 2.5 | 2 | 23900 | 1.9 | 1.08 | 1030 |
| 32 | 13 | 0.005 | 3.85 | 5 | 39200 | 14 | 1.1 | 940 |
| 33 | 14 | 0.01 | 1.4 | 2 | 17800 | 0.05 | 1.3 | 680 |
| 34 | 14 | 0.01 | 5.8 | 3 | 11500 | 198 | 1.3 | 710 |

EXAMPLE 35

10 liters of liquid propylene, 20 ml of triethylaluminum, 5.3 ml of methyl p-methylbenzoate and the catalyst component A (0.001 mmol of Ti) from Example 7 were initially placed in a 15 liter steel autoclave. After injecting hydrogen to a pressure of 0.5 bar, polymerization was carried out at 70° C. for 1 hour. 800 g of polypropylene having an average diameter (d50) of 550 μm were obtained. The bulk density was 380 g/l.

What is claimed is:

1. A process for the preparation of polyolefin by polymerization of alpha-olefins at a temperature from 50° to 100° C. and under a pressure of 3 to 12 bar in the presence of a catalyst composed of a spherical transition metal component (component A) and an organometallic compound (component B) in which the component A has been formed by reacting an organomagnesium compound with an organoaluminum compound, an electron donor, an organic chlorine compound and a transition metal compound, which comprises carrying out the polymerization in the presence of a catalyst in which the component A has been prepared by
   a) forming a solid composed of spherical particles having an average diameter of 20 to 110 μm, a ratio of the mass average diameter $D_m$, to the number average diameter $D_n$ is from 1.01 to 1.15 and a ratio of largest to smallest diameters ranging from 1.05 to 1.15 by reacting an organomagnesium compound of the formula $R^1MgR^2$ in which $R^1$ an $R^2$ are identical or different alkyl radicals having 2 to 12 carbon atoms with an organoaluminum compound of the formula $AlR^3{}_n (OR^4)_{3-n}$ in which $R^3$ and $R^4$ are identical or different alkyl radicals having 1 to 8 carbon atoms and n denotes 0, 1, 2 or 3, or with the product from the reaction of aluminum trialkyls or aluminum dialkyl hydrides with diolefins containing 4 to 20 carbon atoms, and a primary, aliphatic chlorinated hydrocarbon, in an amount of 0.01 to 0.1 mol of the organoaluminum compound an 0.5 to 2.5 mol of the chlorinated hydrocarbon, relative to 1 mol of the organomagnesium compound, at a temperature from 30° to 110° C.,
   b) treating the resulting solid with an electron donor consisting essentially of
      i) oxygen-containing compounds of aluminum, silicon, phosphorus or sulfur, or
      ii) nitrogen or silicon compounds having alkyl or aryl radicals containing 1 to 8 carbon atoms, or
      iii) aliphatic ethers, in an amount of 0.1 to 1 mol per gram atom of the magnesium present in the solid, at a temperature from 0° to 100° C., and
   c) reacting the supporting material thus obtained with a compound of the formula $MeX_m (OR^5)_{4-m}$ in which Me is Ti or Zr, $R^5$ is an alkyl radical having 2 to 10 carbon atoms, X is a halogen atom and m is an integer from 0 to 4, added dropwise to said supporting material in an amount of 0.1 to 2 mol per gram atom of the magnesium present in the supporting material, and at a temperature from 30° to 120° C.

2. The process as claimed in claim 1, wherein the electron donor is selected from the group consisting of alkoxy aluminum compounds, dialkyl sulfites, aliphatic ethers and alkyl silicates.

3. The process as claimed in claim 2, wherein the catalyst component A is in the form of spherical particles having an average diameter of 60 to 90 μm.

4. The process as claimed in claim 3, wherein the catalyst component A has a ratio of mass average diameter, $D_m$, to number average diameter $D_n$, is from 1.01 to 1.2.

5. The process as claimed in claim 4, wherein the electron donor is added to the spherical-shaped solid in a molar ratio of 0.1 to 0.6 relative to 1 gram atom of Mg.

6. The process as claimed in claim 5, wherein the electron donor is dialkyl sulfite.

7. The process as claimed in claim 1, wherein the electron donor is selected from the group consisting of dialkyl sulfites, aliphatic ethers and alkyl silicates.

8. The process as claimed in claim 6, wherein polyethylene is prepared.

9. The process as claimed in claim 8, wherein said diameter of the polyethylene is from 600 to 1500 μm.

10. The process as claimed in claim 1, wherein the electron donor is added to the spherical-shaped solid in a molar ratio of 0.1 to 0.6.

11. The process as claimed in claim 1, wherein the electron donor is dialkyl sulfite.

12. The process as claimed in claim 1, wherein polyethylene is prepared.

13. The process as claimed in claim 12, wherein said diameter of the polyethylene is from 600 to 1500 μm.

14. The process as claimed in claim 10, wherein polyethylene is prepared.

15. The process as claimed in claim 12, wherein said diameter of the polyethylene is from 600 to 1500 μm.

16. A process for the preparation of a polyolefin by polymerization of alpha-olefins at a temperature from 50° to 100° C. and under a pressure of 3 to 12 bar in the presence of a catalyst composed of a spherical transition metal component (component A) and an organometallic compound (component B) in which the component A has been formed by reacting an organomagnesium compound with an organoaluminum compound, an electron donor, an organic chlorine compound and a transition metal compound, which comprises carrying out the polymerization in the presence of a catalyst in which the component A has been prepared by
   a) forming a solid composed of spherical particles having an average diameter of 20 to 110 μm, a ratio of the mass average diameter $D_m$, to the number average diameter Dn less than 1.5 and a ratio of largest to smallest diameters ranging from 1.05 to 1.15 by reacting an organomagnesium compound of the formula $R^1MgR^2$ in which $R^1$ an $R^2$ are identical or different alkyl radicals having 2 to 12 carbon atoms with an organoaluminum compound of the formula $AlR^3 n (OR^4) 3-n$ in which $R^3$ and $R^4$ are identical or different alkyl radicals having 1 to 8 carbon atoms and n denotes 0, 1, 2 or 3, or with the product from the reaction of aluminum trialkyls or aluminum dialkyl hydrides with diolefins containing 4 to 20 carbon atoms, and a primary, aliphatic chlorinated hydrocarbon, in an amount of 0.01 to 0.1 mol of the organoaluminum compound an 0.5 to 2.5 mol of the chlorinated hydrocarbon, relative to 1 mol of the organomagnesium compound, at a temperature from 30° to 110° C.,
   b) treating the resulting solid with an electron donor wherein said electron donor is dialkyl sulfite and is present in an amount of 0.1. to 1 mol per gram atom of the magnesium present in the solid, at a temperature from 0° to 100° C., and
   c) reacting the supporting material thus obtained with a compound of the formula $MeX_m (OR^5)_{4-m}$ in which Me is Ti or Zr, $R^5$ is an alkyl radical having 2 to 10 carbon atoms, X is a halogen atom and m is an integer from 0 to 4, added dropwise to said supporting material in an amount of 0.1 to 2 mol per gram atom of the magnesium present in the supporting material, and at a temperature from 30° to 120° C.

17. The process as claimed in claim 16, wherein polyethylene is prepared.

18. The process as claimed in claim 16, wherein the electron donor is added to the spherical-shaped solid in a molar ratio of 0.1 to 0.6.

* * * * *